United States Patent Office 3,662,070
Patented May 9, 1972

3,662,070
METHOD OF TREATMENT OF EMESIS AND NERVOUS TENSION IN MAMMALS WITH CERTAIN INDOLES-2-CARBOXAMIDES AND DERIVATIVES THEREOF
Michel Leon Thominet, Paris, France, assignor to Societe d'Etudes Scientifiques et Industrielles de L'Ile-De-France, Paris, France
No Drawing. Continuation-in-part of application Ser. No. 657,010, July 31, 1967, now Patent No. 3,573,325, dated Mar. 30, 1971. This application Jan. 6, 1971, Ser. No. 104,500
Claims priority, application France, July 29, 1966, 72,905; Oct. 18, 1966, 80,482
Int. Cl. A61k 27/00
U.S. Cl. 424—274
8 Claims

ABSTRACT OF THE DISCLOSURE

Emesis and/or nervous tension in mammals are substantially diminished by administration of certain N-(1-alkyl-2-pyrrolidylmethyl)-3-alkoxy (or hydroxy)-indoles-2-carboxamides. Treatment may be given orally or parenterally.

---

This application is a continuation-in-part of patent application Ser. No. 657,010, filed July 31, 1967, now U.S. Pat. No. 3,573,325. This invention relates to the treatment of nervous tension and emesis in mammals by the administration of certain new N-(1-alkyl-2-pyrrolidylmethyl)-3-alkoxy (or hydroxy)-indoles-2-carboxamides, their pharmaceutically acceptable acid addition salts, N-oxide and quaternary ammonium salts. The components possess significant therapeutic properties and may be used for the treatment in mammals of nervous tension and emesis associated with many conditions, such as pregnancy and seasickness.

The compounds of this invention employed in the therapeutic treatment of this invention are N-(1-alkyl-2-pyrrolidylmethyl)-3-alkoxy (or hydroxy)-indole-2-carboxamides, their corresponding pharmaceutically acceptable salts of addition with an aliphatic or aromatic acid, N-oxide and quaternary ammonium salts. The N-(1-alkyl-2-pyrrolidylmethyl)-3-alkoxy (or hydroxy)-indole-2-carboxamides have the formula:

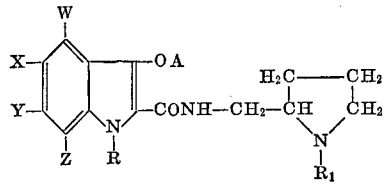

in which W, X, Y and Z are hydrogen or a halogen such as Cl, Br, F, or a branched or unbranched alkoxy radical of low molecular weight (from 1 to 5 carbon atoms), at least two of the substituents of W, X, Y and Z being hydrogen; A and R are hydrogen or branched or unbranched alkyl radicals of low molecular weight (from 1 to 5 carbon atoms); and $R_1$ is an alkyl radical of 1 to 2 carbon atoms. The substituents of W, X, Y and Z may be in 4 and 5; 4 and 6; 4 and 7; 5 and 6; 5 and 7; and 6 and 7.

The process for preparing these compounds utilized in the methods of this invention comprises starting either with a lower alkyl-3-alkoxy (or hydroxy)-indole-2-carboxylate and treating it with an N-(1-alkyl-2-pyrrolidylmethyl)-amine so as to produce the corresponding indole carboxamide, 3-alkoxy (or hydroxy)-indole-2-carboxylic acid 1,1'-sulphinyl diimidazole (Angew. Chem., 7326, 435 (1964)) or 1,1'-carbonyl diimidazole (J. Am. Chem. Soc., 82, 4596 (1966)) in order to produce the corresponding N-acyl imidazole which gives the corresponding indole carboxamide by reaction with an N-(1-alkyl-2-pyrrolidylmethyl)-amine.

Typical compounds utilized in the methods of the invention may be produced as follows.

EXAMPLE I

N-(1-ethyl-2-pyrrolidylmethyl)-3-methoxy-indole-2-carboxamide

Phase A: Methyl ester of N-(2-carbomethoxyphenyl)-glycine.—In a one liter round-bottomed flask provided with a sealed agitator, a reflux condenser and a thermometer there are introduced 109 g. (1 mole) of methyl anthranilate, 302 g. (2 moles) of methyl chloroacetate and 140 g. (1 mole) of potassium carbonate. This is heated at 80° C. for 154 hours.

There is then observed in the bottom of the flask a precipitate of mineral salts beneath a viscous ester precipitate. 1 liter of water is added to dissolve the mineral salts and the aqueous solution obtained is decanted. The viscous residue comprising a mixture of starting anthranilate and ester produced is dissolved with agitation by 250 ml. of water and 200 ml. of concentrated hydrochloric acid. The excess of anthranilate is dissolved and the ester crystallizes. It is dried, washed with 200 ml. of 1% hydrochloric acid and 500 ml. of water.

The product obtained is immediately re-diluted in 60 ml. of 95% alcohol, dried, washed with 60 ml. of 95% alcohol and dried at 40° C.

148 g. (yield: 66%) of methyl ester of N-(2-carbomethoxyphenyl)-glycine (melting point: 95 to 96° C.) are obtained.

Phase B: Methyl indoxylate.—23 g. (1 mole) of sodium are rapidly dissolved in 630 ml. of methyl alcohol in a 2 liter round-bottomed flask provided with a reflux condenser, cooling when the reaction is too quick. 224 g. (1 mole) of methyl ester of N-(2-carbomethoxyphenyl)-glycine are added and the mixture is heated in a water bath. The precipitate is completely dissolved in 20 minutes.

After 2 hours, the indoxylate sodium derivative slowly precipitates. It is heated under strong reflux for 10 hours. After cooling it is dissolved by 4.5 liters of water. There remains an insoluble which is left to crystallize and is then filtered.

The methyl indoxylate is then precipitated by acetic acid. It is dried without heating, washed in water and dried at 40° C.

153 g. of the product are obtained (yield: 80%) (melting point: 157° C.).

Phase C: Methyl 3-methoxy-indole-2-carboxylate.—85 g. (0.445 mole) of methyl indoxylate, 500 ml. of acetone and 59 g. (0.445 mole+5% excess) of methyl sulfate are introduced into a 2 liter round-bottomed flask provided with a sealed agitator, a condenser and a thermometer, and are then heated at 40° C. 61 g. (0.445 mole) of potassium carbonate are slowly added at one time. Heating under reflux is maintained for 3 hours.

350 to 400 ml. of acetone are distilled while agitation continues. It is cooled and 1500 ml. of water are added.

The methyl-3-methoxy-indole-2-carboxylate precipitates. It is dried without heating, washed with 120 ml. of 10% soda, 350 ml. of water, and dried.

88 g. of the product are obtained (yield: 97%) (melting point: 107° C.).

Phase D: N-(1-ethyl-2-pyrrolidylmethyl)-3-methoxy-indole-2-carboxamide.—75 g. (0.365 mole) of methyl-3-methoxy-indole-2-carboxylate, 130 ml. of dry xylene and 95 g. (0.365 mole x 2) of the 1-ethyl-2-aminomethyl-pyrrolidine are introduced into a 500 ml. round-bottomed flask provided with a 30 cm. Vigreux column. This is gently heated so as to distill very slowly the methanol-xylene azeotrope which passes at 63 to 64° C.

The reaction lasts 3 hours 30 minutes. All the methanol produced has then been distilled. The temperature rises to 135° C. and a little more is distilled at this temperature. It is cooled and dissolved with 500 ml. of water and 100 ml. of concentrated hydrochloric acid (to acidity with Congo red). Two layers of liquid are obtained.

The layer of xylene is decanted and extracted once more with 100 ml. of water and 10 ml. of concentrated hydrochloric acid.

The combined aqueous solutions are filtered with 2 g. of black and the N-(1-ethyl-2-pyrrolidylmethyl)-3-methoxy-indole-2-carboxamide is precipitated by 105 ml. of ammonia. The precipitate, at first viscous, solidifies. It is dried without heating and washed in water until the Cl ions disappear. The solid product is recrystallized in a heated state in 300 ml. of isopropyl alcohol. It is left to cool, is filtered and washed on a filter with 70 ml. of isopropyl alcohol.

82 g. of the product are obtained (yield: 74%) (melting point: 143 to 144° C.).

EXAMPLE II

N-(1-ethyl-2-pyrrolidylmethyl)-3-methoxy-indole-2-carboxamide

Phase A: Like Phase A in Example I.

Phase B: Methyl ester of N-(2-carbomethoxy-4-chlorophenyl)-glycine.—89 g. (0.4 mole) of methyl ester of N-(2-carbomethoxyphenyl)-glycine and 500 ml. of acetic acid are introduced into a 1 liter round-bottomed flask provided with an agitator and a thermometer, and are heated to 40° C. to dissolve everything. The solution is then cooled to 27° C. and 53.5 g. (0.4 mole) of chlorosuccinimide are introduced in portions between 25 and 30° C. The solution is then agitated for 4 hours 30 minutes at 25–30° C. and then left to react at 30° C. for 40 hours. Only traces of chlorosuccinimide are left in solution.

The solution produced is poured into 5 liters of water. The N-(2-carbomethoxy-4-chlorophenyl)-glycine methyl ester formed precipitates. It is dried without heating, washed in water and dried at 35° C.

95 g. of this product are obtained (yield: 92%) (melting point: 100–104° C.).

Phase C: Methyl-5-chloroindoxylate.—9.5 g. (0.415 mole) of sodium are dissolved in 190 ml. of methyl alcohol in a 1 liter round-bottomed flask provided with a reflux condenser, N-(2-carbomethoxy-4-chlorophenyl)-glycine is added and the flask is put on a boiling water bath. The sodium derivative begins to precipitate before the ester is totally dissolved. Heating continues for 10 hours. It is cooled and then diluted with 1700 ml. of water. A fairly large insoluble amount remains which is filtered with 3 g. of black. The methyl-5-chloroindoxylate is then precipitated by 70 ml. of acetic acid. It is dried without heating, washed in water and dried. The product obtained is re-dissolved in a cold state in 800 ml. of water and 29 ml. of soda lye. There still remains an insoluble which is filtered and washed. The methyl-5-chloroindoxylate is precipitated by 60 ml. of acetic acid. It is dried without heating, washed in water and dried.

40 g. of this product are obtained (yield: 62%) (melting point: 202 to 203° C.).

Phase D: Methyl-3-methoxy-5-chloroindole-2-carboxylate.—43 g. (0.19 mole) of methyl-5-chloroindoxylate, 310 ml. of acetone and 25 g. (0.19 mole+4% excess) of methyl sulfate are introduced into a 1 liter round-bottomed flask provided with a sealed agitator, a reflux condenser, a thermometer and a dropping funnel, and are heated to 40° C. Only part of the indoxylate dissolves. 26 g. (0.19 mole) of potassium carbonate are then added in a single portion in a thin stream and heating under reflux is effected for 3 hours 30 minutes. A part of the acetone (250 ml. approximately) is then distilled, cooled and diluted with 350 ml. of water. The methyl-3-methoxy-5-chloroindole-2-carboxylate precipitates. It is dried without heating, washed with 120 ml. of 2% soda and then with water and dried.

45 g. of this product are obtained (yield: 99%) (melting point: 144° C.).

Phase E: N-(1-ethyl-2-pyrrolidylmethyl)-3-methoxy-5-chloroindole-2-carboxamide.—33 g. of methyl-3-methoxy-5-chloroindole-2-carboxylate, 57 ml. of xylene and 35 g. of 1-ethyl-2-aminomethyl pyrrolidine are introduced into a 250 ml. round-bottomed flask provided with a Vigreux column, and are gently heated in order to distill the methanol-xylene azeotrope which passes at 64° C. After 3 hours 30 minutes to 4 hours all the methanol has distilled. A little more xylene is distilled.

It is then cooled, dissolved with 400 ml. of water and 40 ml. of concentrated hydrochloric acid. The hydrochloride which is little soluble in cold water, crystallizes. The xylene must therefore be washed away in water. The solution obtained is filtered while boiling with 2 g. of black and the base is precipitated in a hot state by 48 ml. of ammonia. At first viscous, the base solidifies. It is then dried without heating, washed in water and dried.

The base obtained is re-dissolved in 500 ml. of water and 22 ml. of concentrated hydrochloric acid. The solution is treated with 5 ml. of sodium bisulphite for several hours. When the hydrochloride has recrystallized, the solution is heated and filtered while boiling with 2 g. of black and the base is then precipitated by 35 ml. of ammonia. The precipitate which is at first viscous solidifies. After cooling it is dried without heating and washed in water until the chlorine ions disappear.

34 g. of 3-(1-ethyl-2-pyrrolidylmethyl)-3-methoxy-5-chloroindole-2-carboxamide are obtained (yield: 74%) (melting point: 178 to 179° C.).

Phase F: N-(1-ethyl-2-pyrrolidylmethyl)-3-methoxy-5-chloroindole-2-carboxamide hydrochloride.—34 g. (0.1 mole) of N-(1-ethyl-2-pyrrolidylmethyl)-3-methoxy-5-chloroindole-2-carboxamide are dissolved in 150 ml. of methyl alcohol and 3.6 g. of dry hydrochloric acid dissolved in 50 ml. of methyl alcohol are added. The indole hydrochloride formed precipitates. It is dried without heating, washed on a filter with 30 ml. of methyl alcohol and then 30 ml. of acetone and is dried. It is a solid white body: melting point: 229 to 233° C.

EXAMPLE III

N-(1-ethyl-2-pyrrolidylmethyl)-1-methyl-3-methoxy-indole-2-carboxamide

Phase A: N-methylanthranilic acid.—137 g. (1 mole) of anthranilic acid and 400 ml. of water are introduced into a 2 liter round-bottomed flask provided with an agitator, a thermometer and a dropping funnel, and 101 ml. of soda lye are added until phenolphthalein changes color. The solution obtained is heated to 32° C. and 126 g. (1 mole) of methyl sulfate are added drop by drop. The reaction is exothermic and cooling is effected if necessary in order not to exceed 45° C. N-methylanthranilic acid precipitates from the beginning of the reaction. When addition is completed, agitation is continued for 1 hour more. The solution is then cooled, dried without heating and washed in water until the sulfate ions are eliminated. The acid obtained is recrystallized in 115 ml. of acetic acid. After cooling it is dried without heating, washed with 10 ml. of acetic acid and then in water and dried.

91 g. of N-methylanthranilic acid are obtained (yield: 80%) (melting point: 176 to 177° C.).

Phase B: N-methyl-N-(2-carboxyphenyl)-glycine.—91 g. (0.60 mole) of N-methylanthranilic acid, 260 ml. of water and 61 ml. of soda are introduced in a 2 liter round-bottomed flask provided with a reflux condenser until phenolphthalein changes color. In a separate flask 85 g. (0.60 mole+5% excess) of monochloroacetic acid are dissolved in 180 ml. of water and 48 g. of sodium carbonate, and the two solutions are mixed. They are heated under reflux for 6 hours 30 minutes. The solution obtained is cooled, filtered with 2 g. of black and acidified with 50 ml. of concentrated hydrochloric acid. The acid precipitates after a delay. It is dried without heating and washed in water until the chlorine ions are eliminated and dried at 40° C.

This acid is recrystallized in 250 ml. of acetic acid. After cooling it is dried without heating, washed in acetic acid and then in water and dried at 40° C.

71 g. of N - methyl-N-(2-carboxyphenyl)-glycine are obtained (yield: 84%) (melting point: 190 to 191° C.).

Phase C: N-methyl-N-(2-carbomethoxyphenyl)-glycine methyl ester.—395 ml. of methyl alcohol, and then drop by drop with cooling 170 g. of 20% $SO_3$ oleum, and finally 110 g. of N-methyl-N-(2-carboxy-phenyl) glycine are introduced into a 1 liter round-bottomed flask provided with a reflux condenser. Heating under reflux effected for 10 hours. A part of the alcohol (150 ml.) is then distilled and the residue is poured into a solution of 200 g. of sodium carbonate in 2 liters of water. The ester separates in the form of an oil which is decanted. It is verified that the solution is slightly alkaline and it is extracted with ether. The ethereal organic solution is dried on potassium carbonate. After the ether is eliminated, the ester is distilled under vacuum.

86 g. (yield: 69%) of N-methyl-N-(2-carbomethoxyphenyl) glycine methyl ester are obtained (melting point: 172 to 173° C.).

Phase D: Methyl N-methyl indoxylate.—8.35 g. of sodium (0.363 mole) are dissolved in 230 ml. of methanol in a 500 ml. round-bottomed flask provided with a reflux condenser. 86 g. (0.363 mole) of N-methyl-N-(2-carbomethoxyphenyl) glycine methyl ester is added, and the mixture is heated in a water bath. The indoxylate soda derivative begins to precipitate from the beginning of the reaction. Heating under reflux is continued for 6 hours 30 minutes. The mixture is then cooled and diluted with 2300 ml. of water. There remains an insoluble which is filtered and washed. Ether extraction is then effected to produce a clear solution from which the indoxylate is precipitated by the addition of acetic acid.

The precipitate obtained is dried without heating, washed in water until it is neutral and dried at 40° C. (melting point: 148° C.) (yield: 77%).

Phase E: Methyl - 1 - methyl-3-methoxy-indole-2-carboxylate.—57 g. (0.278 mole) of methyl N-methyl indoxylate, 400 ml. of acetone and 38 g. (0.278 mole+1% excess) of dimethylic sulfate are introduced into a 500 ml. round-bottomed flask provided with a sealed agitator, a reflux condenser and a thermometer, and heated to 40° C. 38 g. (0.278 mole) of potassium carbonate are then added slowly in a single portion. It is then put under reflux for 3 hours.

150 ml. of acetone is distilled and dissolved with 1.600 liters of water. The methyl ester crystallizes after a delay. It is dried without heating, washed in water and dried in air (melting point: 42 to 43° C.) (weight 57 g.) (yield: 94%).

Phase F: 1 - methyl - 3 - methoxyindole-2-carboxylic acid.—57 g. (0.26 mole) of methyl-1-methyl-3-methoxyindole-2-carboxylate, 73 ml. of alcohol and 27 ml. of 30% soda are introduced into a 500 ml. round-bottomed flask provided with a reflux condenser and are heated in a water bath. The sodium salt precipitates immediately and sets in a mass.

After 1 hour 30 minutes to 2 hours of reflux, 250 ml. of water are gradually added, heating being maintained. The sodium salt dissolves. It is then diluted with 500 ml. of water, and the solution is cooled and filtered with 1 g. of black. The acid is then precipitated by 29 ml. of concentrated hydrochloric acid. After cooling it is dried without heating, washed in water until the chlorine ions are eliminated and is then dried at 40° C.

51 g. (yield: 95%) of 1-methyl-3-methoxyindole-2-carboxylic acid is obtained (melting point: 109 to 110° C.).

Phase G: N-(1 - ethyl-2-pyrrolidylmethyl)-1-methyl-3-methoxyindole-2-carboxamide.—84 g. (0.245 mole x 5) of imidazole are dissolved in 540 ml. of tetrahydrofuran in a 2 liter round-bottomed flask provided with a sealed agitator, a reflux condenser, a thermometer and a dropping funnel. 37 g. of thionyl chloride are poured in without exceeding 10° C. Imidazole hydrochloride precipitates from the beginning of the reaction. The temperature is subsequently allowed to rise to 20° C. and is maintained for half an hour.

51 g. (0.245 mole) of finely powdered 1-methyl-3-methoxyindole-2-carboxylic acid is added. A change in the appearance of the precipitate is observed at the same time as a rise in temperature. After cooling to 20° C., the mixture is maintained for 1 hour 15 minutes at 50° C.

The mixture is cooled to 20° C. and 50 g. of triethylamine is added. The temperature again rises to 33° C. and the precipitate again changes in appearance. The mixture is heated to 50° C. and maintained for 45 minutes. After cooling to 20° C., 63 g. (0.245 mole x 2) of 1-ethyl-2-aminomethyl - pyrrolidine is poured in drop by drop. The temperature rises to 35° C. The mixture is maintained for 1 hour at this temperature and then for 2 hours 30 minutes at 50° C.

The precipitate is then dried without heating and washed with 150 ml. of tetrahydrofuran. The major part of the solvent is distilled under vacuum. The residue is dissolved in 520 ml. of water. The base is precipitated in part. Precipitation is completed by adding 80 ml. of ammonia. The base obtained is liquid. It is decanted and extracted with ether. The ethereal layer is dissolved with 500 ml. of water and 50 ml. of concentrated hydrochloric acid. The ether is decanted and washed once with acid water. The aqueous solutions are brought together. The pH is restored to 6. The solution obtained is treated with 7 ml. of sodium bisulphite. Considerable discoloration is observed. The base is again precipitated by adding 90 ml. of ammonia. It is decanted, the aqueous solution is extracted with ether and the ethereal solution is washed three times with 100 ml. of water. It is then dried on potassium carbonate. The ether is then distilled, concluding under vacuum, until a constant weight is attained.

83 g. (yield: 96.5%) of N-(1-ethyl-2-pyrrolidylmethyl)-1-methyl-3-methoxyindole-2-carboxamide is obtained.

Phase H: N-(1-ethyl-2-pyrrolidylmethyl)-1-methyl-3-methoxyindole-2-carboxamide phosphate.—The base obtained in Phase G is dissolved in 300 ml. of absolute alcohol and 35 g. of 85% phosphoric acid dissolved in 40 ml. of alcohol is then added. The phosphate crystallizes, is dried without heating, washed in alcohol and dried at 40° C. (melting point: 164° C.).

EXAMPLE IV

N-(1-ethyl-2-pyrrolidylmethyl)-1-ethyl-3-methoxyindole-2-carboxamide

Phase A: N-ethyl-anthranilic acid.—247 g. (2 moles) of anthranilic acid and 800 ml. of water are introduced into a 3 liter round-bottomed flask provided with an agitator, a thermometer and a dropping funnel, and 200 ml. of 30% soda is added until phenolphthalein changes color. The solution obtained is heated at 35 to 40° C. and 308 g. (2 moles) of ethyl sulfate are added drop by drop. The N-ethyl-anthranilic acid precipitates from the beginning of the addition which lasts approximately 1 hour 15 minutes. The reaction is exothermic and is slightly cooled in order that the temperature does not exceed 48 to 49° C.

Agitation is then maintained for 1 hour. After cooling, the precipitate is then dried without heating, washed in water until the sulfate ions are eliminated and is then dried.

277 g. (yield: 84%) of N-ethyl-anthranilic acid is obtained (melting point: 154° C.).

Phase B: N-ethyl-N-(2-carboxphenyl) glycine.—183 g. (1.11 mole) of N-ethyl anthranilic acid, 457 ml. of water and 110 ml. of 10% soda are introduced into a 2 liter round-bottomed flask provided with a reflux condenser, until phenolphthalein changes color. In another flask 157 g. (1.11 mole+50% excess) of monochloroacetic acid is dissolved in 350 ml. of water and 89 g. of sodium carbonate, and the two solutions are mixed. Heating under reflux is effected for 4 hours. The solution obtained is filtered with 2 g. of black and then acidified with 90 ml. of concentrated hydrochloric acid until Congo red changes color. The acid occasionally precipitates after a delay. It is dried without heating, washed in water until the chlorine ions are eliminated and is dried at 40° C.

180 g. (yield: 73%) of N-ethyl-N-(2-carboxyphenyl)-glycine is obtained (melting point: 190 to 191° C.).

Phase C: N-ethyl-N-(2-carbomethoxyphenyl)glycine methyl ester.—300 ml. of methyl alcohol is introduced into a 1 liter round-bottomed flask provided with a reflux condenser, and then drop by drop and with cooling 160 g. of 20% oleum and finally 90 g. (0.4 mole) of N-ethyl-N-(2-carboxyphenyl)glycine which dissolves rapidly.

Heating under reflux is effected for 10 hours. A part of the alcohol is then distilled and the residue is poured into a solution of 180 g. of sodium carbonate in 2 liters of water. The ester separates in the form of an oil which is decanted. It is verified that the aqueous solution is slightly alkaline and it is extracted with ether. The ethereal organic solution is dried on potassium carbonate. After the ether is eliminated, the ester is distilled under vacuum (B.P./5 mm.: 156 to 157° C.) (weight: 62 g.).

Phase D: Methyl-N-ethyl indoxylate.—5.7 g. (0.247 mole) of sodium is dissolved in 110 ml. of methanol in a 500 ml. round-bottomed flask provided with a reflux condenser. 62 g. (0.247 mole) of N-ethyl-N-(2-carbomethoxyphenyl) glycine methyl ester is added and the mixture is heated in a boiling water bath. A fluorescent solution is obtained which is heated under reflux for 6 hours 30 minutes.

The solution is cooled and diluted with 1 liter of water. There remains an insoluble which gradually solidifies. The solution which was still slightly cloudy is filtered and extracted with ether.

The indoxylate is then precipitated by adding 40 ml. of acetic acid. The precipitate is dried wthout heatng, washed in water until it is neutral and dried at 40° C. (weight: 42 g.) (melting point: 88 to 89° C.).

Phase E: Methyl-1-ethyl-3-methoxyindole-2 - carboxylate.—43 g. (0.19 mole) of methyl-N-ethyl indoxylate, 210 ml. of acetone and 25 g. of methyl sulfate are introduced into a 1 liter round-bottomed flask provided with a sealed agitator, a reflux condenser and a thermometer, and the mixture is heated to 40° C. A solution is obtained to which 26 g. of potassium carbonate is added slowly and in a single portion. The reaction is slightly exothermic and the temperature rises from 4 to 5° C. The solution is then heated under reflux for 3 hours.

190 ml. of acetone is then distilled, and the residue is cooled and dissolved with 200 ml. of water. The mineral salts dissolve and the methyl derivative which is at first liquid solidifies. It is dried without heating, washed with 120 ml. of 2% soda and then in water, and is dried.

43 g. of this product is obtained (yield: 98%) (melting point: 57° C.).

Phase F: 1-ethyl-3-methoxyindole-2-carboxylic acid.— 47 g. (0.18 mole) of methyl-1-ethyl-3-methoxyindole carboxylate, 55 ml. of ethyl alcohol and 20 ml. of 30% soda are introduced into a 500 ml. round-bottomed flask provided with a reflux condenser, and the mixture is then heated on a water bath. The sodium salt precipitates very rapidly, and sets in a mass. After 1 hour 30 minutes 100 ml. of water is gradually added, heating being maintained. The solution is then diluted with 400 ml. of water, and the solution obtained is slightly cooled and filtered with 1 g. of black.

The acid is then precipitated by adding 20 ml. of concentrated hydrochloric acid to the luke warm solution. At first liquid, it solidifies. After cooling, it is dried without heating, washed in water until the chlorine ions are eliminated and is dried at 40° C.

37 g. (95%) of a product melting at 102° C. is obtained.

Phase G: N - (1-ethyl-2-pyrrolidylmethyl)-1-ethyl-3-methoxyindole-2-carboxamide.—136 g. (0.4 mole x 5) of imidazole is dissolved in 800 ml. of tetrahydrofuran in a 2 liter round-bottomed flask provided with a sealed agitator, a reflux condenser and a thermometer, and 61 g. of thionyl chloride is introduced drop by drop without exceeding 10° C. Imidazole hydrochloride precipitates from the beginning of the reaction. Agitation is subsequently maintained for half an hour at 20° C. 88 g. (0.4 mole) of finely powdered 1-ethyl-3-methoxyindole-2-carboxylic acid is then added. The temperature rises to 32° C. at the same time as the precipitate liquefies. It is cooled to 20° C., this temperature being maintained for 1 hour, and is then heated at 50° C. for 30 minutes.

The solution is cooled to 20° C. and 81 g. (0.4 mole x 2) of 1-ethyl-2-aminomethyl-pyrrolidine is added drop by drop. The reaction is exothermic. The temperature attains 38° C. In this condition agitation is effected for 1 hour and then for 2 hours at 50° C.

After cooling, the precipitate is dried without heating and washed with 300 ml. of tetrahydrofuran. The major part of the solvent is then distilled under vacuum. The residue is dissolved in 1 liter of water and the pH is brought to approximately 6 by adding 130 ml. of concentrated hydrochloric acid. The solution obtained is treated with 10 ml. of sodium bisulfite for 1 hour 30 minutes and is filtered with 2 g. of black. The ethereal solution obtained is washed six times with 100 ml. of water and dried on potassium carbonate. The ether is then distilled, concluding under vacuum, until a constant weight is obtained.

126 g. (yield: 96%) of N-(1-ethyl-2-pyrrolidylmethyl)-1-ethyl-3-methoxyindole-2-carboxamide is obtained.

Phase H: N - (1-ethyl-2-pyrrolidylmethyl)-1-ethyl-3-methoxyindole-2-carboxamide phosphate.—The base (126 g.) is dissolved in 300 ml. of alcohol and 45 g. of 85% phosphoric acid dissolved in 50 ml. of alcohol is added. The phosphate crystallizes slowly after being started. It is dried without heating, washed with 200 ml. of absolute alcohol, first dried in air and then at 40° C.

122 g. (yield: 75%) of product (melting point: 150 to 152° C.) is obtained.

EXAMPLE V

N-(1-ethyl-2-pyrrolidylmethyl)-1-propyl-3-methoxyindole-2-carboxamide

Phase A: N-propyl anthranilic acid.—205 g. (1.5 moles) of anthranilic acid and 600 ml. of water are introduced into a 3 liter round-bottomed flask provided with a condenser, and 150 ml. of 30% soda is added. 188 g. (1.5 moles) of propyl bromide is then introduced and heating under reflux is effected for 12 hours. When the reaction is completed, cooling is effected under agitation, the N-propyl anthranilic acid which is formed solidifies but remains slightly viscous. It is dried without heating and washed with a little water.

This precipitate is redissolved in 250 ml. of water and 200 ml. of 30% soda lye. A thin oily layer remains floating on the surface and is filtered and washed with 100 ml. of water. By cooling the sodium salt crystallizes. It is dried without heating at about 10° C. and washed with 250 ml. of icy cold water. It is immediately redissolved in 1 liter of hot water. The cloudy solution is filtered and the acid is precipitated in its hot state by 60 ml. of acetic acid. After cooling, it is dried without heating, washed in water and dried at 40° C.

106 g. (yield: 39%) of N-propyl anthranilic acid (melting point: 113 to 114° C.) is obtained.

Phase B: N-propyl-N-(2-carboxyphenyl) glycine.—106 g. (0.59 mole) of N-propyl anthranilic acid, 240 ml. of water and 62 mol. of 30% soda are introduced into a 1 liter round-bottomed flask provided with a reflux condenser. In another flask 84 g. of chloroacetic acid are dissolved in 110 ml. of water and 47 g. of sodium carbonate and the two solutions are mixed. Heating under reflux is effected for 6 hours.

The solution obtained is cloudy and is filtered with 3 g. of black. As the sodium salt crystallizes, heating to close to the boiling point must be effected in order to dissolve everything. The acid is then precipitated by 50 ml. of hydrochloric acid.

After cooling, the N-propyl-N-(2-carboxyphenyl) glycine formed is dried without heating, washed in water until the chlorine ions are eliminated and is dried at 50° C.

101 g. of product are obtained (yield: 72%) (melting point: 205 to 206° C.).

Phase C: N-propyl-N-(2-carbomethoxyphenyl) glycine methyl ester.—320 g. of methyl alcohol are introduced into a 1 liter round-bottomed flask provided with a reflux condenser, and then drop by drop with cooling 168 g. of 20% $SO_3$ oleum, and finally 99 g. (0.42 mole) of N-propyl-N-(2-carboxyphenyl)glycine. Heating under reflux is effected for 10 hours.

A part of the alcohol is then distilled and the residue is poured into a solution of 168 g. of sodium carbonate in 1500 ml. of water. It is verified that the aqueous solution is slightly alkaline and it is extracted with ether. The ethereal solution is washed with 100 ml. of water containing 10 ml. of acetic acid and is then dried on calcium chloride. After the ether is eliminated, the ester is distilled under vacuum.

73 g. (yield: 66%) of N-propyl-N-(2-carbomethoxyphenyl) glycine methyl ester is obtained: B.P./13–14 mm.—184–185° C.

Phase D: Methyl-N-propyl indoxylate.—6 g. (0.275 mole) of sodium is dissolved in 125 ml. of ethyl alcohol in a 500 ml. round-bottomed flask provided with a reflux condenser, and 73 g. (0.275 mole) of N-propyl-N-(2-carbomethoxyphenyl) glycine methyl ester is added. A solution is obtained which is heated under reflux in a water bath for 12 hours.

The solution is cooled and 1250 ml. of water is added. An insoluble which is left is filtered. As the solution is still slightly cloudy, it is extracted once with a little ether. The indoxylate is then precipitated by 30 ml. of acetic acid. At first liquid, it solidifies when a stream of air is passed through it. It is dried without heating, washed in water until it is neutral and dried in air.

38 g. of this product (yield: 59%) (melting point: 65 to 66° C.) is obtained.

Phase E: Methyl-1-propyl-3-methoxyindole-2-carboxylate.—38 g. of methyl-N-propyl indoxylate, 200 ml. of acetone and 22 g. of methyl sulfate are introduced into a 1-liter round-bottomed flask provided with a sealed agitator, a reflux condenser and a thermometer, and the mixture is heated to 40° C. A solution is obtained to which 22 g. of potassium carbonate is slowly added in a single portion, the solution then being heated under reflux for 3 hours 30 minutes.

A part of the acetone is distilled, is cooled and 500 ml. of water is added under agitation. The mineral salts dissolve. The ester separates in liquid form. It is decanted and the aqueous solution is extracted with methylene chloride. The organic solution produced in this way is washed with 3 times 100 ml. of 2% soda and then dried on potassium carbonate. The methylene chloride is then distilled.

39 g. (yield: 100%) of methyl-1-propyl-3-methoxyindole-2-carboxylate is obtained.

Phase F: 1-propyl-3-methoxyindole-2-carboxylic acid. —39 g. (0.16 mole) of methyl-1-propyl-3-methoxyindole-2-carboxylate, 50 ml. of alcohol and 18 ml. of 30% soda are introduced into a 500 ml. round-bottomed flask provided with a reflux condenser, and the mixture is heated in a water bath. The sodium salt precipitates and sets in a mass very rapidly.

After two hours 500 ml. of water are added gradually, heating being maintained. The salt dissolves and a cloudy solution is obtained and is then filtered with 3 g. of black. The acid is then precipitated by 20 ml. of hydrochloric acid. After cooling the acid is dried without heating, washed in water until the chlorine ions are eliminated and dried at 40° C.

33 g. (yield: 89%) of 1-propyl-3-methoxyindole-2-carboxylic acid is obtained (melting point: 91 to 92° C.).

Phase G: N-(1-ethyl-2-pyrrolidylmethyl)-1-propyl-3-methoxyindole-2-carboxamide.—85 g. (0.25 mole x 5) of imidazole is dissolved in 520 ml. of tetrahydrofuran in a 2 liter round-bottomed flask provided with a sealed agitator, a reflux condenser and a thermometer, and 38 g. of thionyl chloride is poured in without the temperature exceeding 10° C. Imidazole hydrochloride precipitates from the beginning of the reaction. The temperature is then allowed to rise to 20° C. and is maintained for half an hour.

59 g. of finely powdered 1-propyl-3-methoxyindole-2-carboxylic acid is then added. The temperature rises to 35–36° C. and the mixture becomes more liquid. The mixture is then cooled to 20° C. and then heated at 50° C. for 30 minutes. After cooling to 20° C., 51 g. of triethylamine is added drop by drop. The temperature rises to 34° C. at the same time as the precipitate again changes in appearance. The temperature is maintained for 1 hour at 50° C. and then reduced to 20° C. by cooling.

64 g. (0.25 mole x 2) of 1-ethyl-2-aminoethylpyrrolidine is added drop by drop. The temperature rises to 36–37° C. in 10 minutes. Agitation is effected at this temperature for 1 hour and then for 3 hours at 50° C.

After cooling, the precipitate is dried without heating and washed with 300 ml. of tetrahydrofuran. The major part of the solvent is distilled under vacuum. The residue is taken up by 650 ml. of water and dissolved by adding 80 ml. of concentrated hydrochloric acid, the pH being adjusted to 6–7. The solution is cloudy and is filtered with 2 g. of black. The base is then precipitated by 160 ml. of ammonia. It is decanted and the aqueous solution is extracted with ether.

The ethereal solution produced in this manner is dissolved with 500 ml. of water and 50 ml. of concentrated hydrochloric acid. The base dissolves in the water in the form of hydrochloride. The ether is decanted. The base is again precipitated by adding 90 ml. of ammonia. It is decanted and the aqueous solution is extracted with ether and the ethereal solution is washed three times with 100 ml. of water and is then dried on potassium carbonate. The ether is then distilled.

83 g. (yield: 96.5%) of N-(1-ethyl-2-pyrrolidylmethyl)-propyl-3-methoxyindole carboxamide is obtained.

Phase H: N-(1-ethyl-2-pyrrolidylmethyl)-1-propyl-3-methoxy-indole-2-carboxamide phosphate.—68 g. (0.2 mole) of N-(1-ethyl-2-pyrrolidylmethyl) - 1 - propyl-3-methoxyindole-2-carboxamide are dissolved in 150 ml. of absolute alcohol. 25 g. of 85% phosphoric acid dissolved in 25 ml. of absolute alcohol are added. The phosphate crystallizes. It is dried without heating and washed in alcohol.

73 g. (yield: 83%) of product (melting point: 145–146° C.) is obtained.

The acute degrees of toxicity which have been studied on mice have shown that the compounds which are the object of the present invention are of a toxicity which is completely compatible with therapeutic use. They have been summed up by way of example in the following table.

| Compounds: | $LD_{50}$ in mg./kg. (Compound in base form), i.v. |
|---|---|
| N-(1-ethyl-2-pyrrolidylmethyl) - 3 - methoxy-indole-2-carboxamide | 23.5 |
| N-(1-ethyl - 2 - pyrrolidylmethyl)-3-methoxy 5-chloro-indole-2-carboxamide | 33.4 |
| N-(1-ethyl-2-pyrrolidylmethyl) - 1 - methyl-3-methoxy-indole-2-carboxamide | 11.3 |
| N-(1-ethyl - 2 - pyrrolidylmethyl)-1-ethyl-3-methoxy-indole-2-carboxamide | 15 |
| N-(1-ethyl - 2 - pyrrolidylmethyl)-1-propyl-3-methoxy-indole-2-carboxamide | 18.7 |
| N-(1-ethyl-2-pyrrolidylmethyl) - 1 - butyl-3-methoxy-indole-2-carboxamide | 13.5 |

The anti-emetic action of these compounds on the vomiting centers has been studied on dogs by means of apomorphine in accordance with the technique of Chen and Ensor taken up by Ducrot and P. Decourt. Tests were carried out on groups of four dogs.

The following table shows the result of the testing of the compounds employed in the methods of this invention.

| Compounds: | Degree of protection with a dose of 2.5 mg./kg. (base), percent |
|---|---|
| N-(1-ethyl - 2 - pyrrolidylmethyl)-3-methoxy-indole-2-carboxamide | 100 |
| N-(1-ethyl-2-pyrrolidylmethyl) - 3 - methoxy-5-chloroindole-2-carboxamide | 100 |
| N-(1-ethyl - 2 - pyrrolidylmethyl)-1-methyl-3-methoxyindole-2-carboxamide | 100 |
| N-(1-ethyl-2-pyrrolidylmethyl) - 1 - ethyl-3-methoxindole-2-carboxamide | 100 |
| N-(1-ethyl-2-pyrrolidylmethyl) - 1 - propyl-3-methoxyindole-2-carboxamide | 100 |
| N-(1-ethyl-2-pyrrolidylmethyl) - 1 - butyl-3-methoxyindole-2-carboxamide | 100 |

The pharmacological effects on the central nervous system of compounds utilized in the methods of this invention were studied and the following results are given by way of example for four such compounds.

Compound 1=N-(1-ethyl-2-pyrrolidylmethyl)-3-methoxyindole-2-carboxamide
Compound 2=N-(1-ethyl-2-pyrrolidylmethyl)-1-methyl-3-methoxyindole-2-carboxamide
Compound 3=N-(1-ethyl-2-pyrrolidylmethyl)-1-ethyl-3-methoxyindole-2-carboxamide
Compound 4=N-(1-ethyl-2-pyrrolidylmethyl)-1-propyl-3-methoxyindole-2-carboxamide

| Test | Compound 1 | Compound 2 | Compound 3 | Compound 4 |
|---|---|---|---|---|
| Cataleptic activity, $ED_{50}$ mg./kg./ S.C. (base), rat. | 0% effect at 20 mg./kg. | 17.2 | 9.1 | 2.1. |
| Traction test, $ED_{50}$ mg./kg./S.C. (base), mouse. | 20% effect at 60 mg./kg. | 23.7 | 30.8–33.9 | ≠≠35–31.5. |
| Potentialization of the barbituric narcosis, $ED_{50}$ mg./kg./i.p. (base), mouse. | Inactive index=0.93 at 40 mg./kg. | Index=1.23 at 40 mg./kg. | Index=1.65 at 40 mg./kg. | ≠≠39. |
| Spontaneous motility, $ED_{50}$ mg./kg./ i.p. mouse: | | | | |
| Winter and Flataker test | 25.7 | 6.3 | ≠≠2.6–1.36 | 1.75–1.35. |
| Activograph | 18.7 | 3.4 | 0.86 | 0.96. |
| Antimorphine activity, $ED_{50}$ mg./ kg./p.o. (base), mouse. | Inactive 14% protection at 100 mg./kg. | 16% effect at 80 mg./kg. | 31% effect at 80 mg./kg. | 18% effect at 150 mg./kg. |
| Antitremorine activity, $ED_{50}$ mg./ kg./i.p. (base), mouse. | 2.9 | ≠≠30 | 2.8 | 20% effect at 30 mg./kg. |
| Revolving shaft test, $ED_{50}$ mg./kg./ i.p. (base), mouse. | 42.8 | 16.8 | 17.7 | 24.9. |
| Anti-convulsant activity: | | | | |
| Electrical crisis, S.C. | 25.9 | 10.5 | 17.3 | 19.8–21. |
| $ED_{50}$ mg./kg.,mouse, p.o. | 125 | 51–52.6 | 78.6–84.8 | 30% effect at 100 mg./kg. |
| Chemical crisis, i.p. | Nil effect at 60 mg./kg. | 10% protection at 40 mg./kg. | Nil effect at 40 mg./kg. | Nil effect at 40 mg./kg. |
| $ED_{50}$ mg./kg., mouse, p.o. | 30% protection at 200 mg./kg. | Nil effect at 100 mg./kg. | Nil effect at 100 mg./kg. | Nil effect at 100 mg./kg. |
| Analgesic activity: | | | | |
| Mechanical stimulus, $ED_{50}$ mg./ kg./i.p., mouse. | 20% effect at 40 mg./kg. | 16.8 | 20% effect at 40 mg./kg. | 40% effect at 50 mg./kg. |
| Chemical stimulus, $ED_{50}$ mg./ kg./i.p., mouse. | 22% effect at 80 mg./kg. | ≠≠29 | 33% effect at 60 mg./kg. | 40% effect at 40 mg./kg. |

The apomorphine was administered subcutaneously in doses of 0.10 mg./kg. The compounds under study were administered 30 minutes previously, also subcutaneously.

The number of vomitings was counted in the 30 minutes following the injection of apomorphine.

In the testing, dogs were treated with the compounds employed in the methods of this invention and further received the apomorphine. Their behavior was compared with dogs and received apomorphine only. The vomitings were numbered in each case. If the dogs treated with the compounds employed in the methods of this invention had no vomiting at all, they were deemed protected at 100%. If they had as many vomitings as the dogs having received apomorphine only, they were deemed protected at 0%. Between these two extreme values, the proportion of vomitings in the two groups of dogs was calculated, according to which, the degree of protection between 0 and 100 was determined.

The compounds utilized in the methods of treatment of this invention may be administered parenterally or orally, desirably as pharmaceutically acceptable salts. They may be used in the form, for example, of sugar coated tablets, injectable solutions in ampoules, aqueous solutions for use in aerosol or other sprays, suppositories, granulated preparations with sugar and sweetened syrups.

The duration of the treatment and the dosage utilized vary with the severity of the emesis or nervous tension treated. With mammals having the weight span of man, the daily dosage is in the range of 20 to 500 mg. according to the weight of the mammal and the severity of illness. Such treatment and dosage in a particular situation would be determined by a professional skilled in the art of the prevention, cure and alleviation of diseases, illness and injury of mammals, guided by the data given herein.

What is claimed is:

1. The method of treating emesis or nervous tension in mammals, said method comprising administering to a mammal requiring such treatment a therapeutically effective dose of a N-(1-alkyl-2-pyrrolidylmethyl)-3-alkoxy-(or hydroxy)-indole-2-carboxamide, a pharmaceutically acceptable acid salt thereof, an N-oxide thereof or a quaternary salt thereof, said N-(1-alkyl-2-pyrrolidylmethyl)-3-alkoxy-(or hydroxy)-indole-2-carboxamide having the formula:

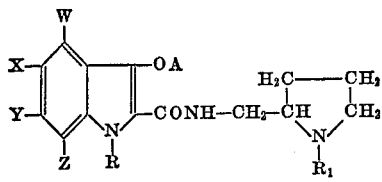

in which W, X, Y and Z are hydrogen, halogen or lower alkyl, at least two of W, X, Y, and Z being hydrogen; A is hydrogen or lower alkyl; R is hydrogen or lower alkyl; and $R_1$ is methyl or ethyl.

2. The method of claim 1 in which the daily dose is 20 to 500 mg.

3. The method of claim 1 in which the compound is N-(1-ethyl - 2 - pyrrolidylmethyl)-3-methoxyindole-2-carboxamide.

4. The method of claim 1 in which the compound is N-(1 - ethyl - 2 - pyrrolidylmethyl)-3-methoxy-5-chloroindole-2-carboxamide.

5. The method of claim 1 in which the compound is N-(1-ethyl - 2 - pyrrolidylmethyl)-1-methyl-3-methoxy-indole-2-carboxamide.

6. The method of claim 1 in which the compound is N-(1 - ethyl - 2 - pyrrolidylmethyl)-1-ethyl-3-methoxy-indole-2-carboxamide.

7. The method of claim 1 in which the compound is N-(1-ethyl - 2 - pyrrolidylmethyl)-1-propyl-3-methoxy-indole-2-carboxamide.

8. The method of claim 1 in which the compound is N-(1 - ethyl - 2 - pyrrolidylmethyl)-1-butyl-3-methoxy-indole-2-carboxamide.

References Cited

UNITED STATES PATENTS 3,198,807   8/1965   Thominet _____ 260—326.14 X

OTHER REFERENCES

Paul et al.: J. Am. Chem. Soc., 82:4596–4600 (1960).

STANLEY J. FRIEDMAN, Primary Examiner